United States Patent
Hall

(10) Patent No.: US 8,036,696 B2
(45) Date of Patent: Oct. 11, 2011

(54) TIME-MULTIPLEXED, TWO TIER WIRELESS DEVICE AND METHOD THEREFOR

(75) Inventor: Robert J. Hall, Berkeley Heights, NJ (US)

(73) Assignee: AT&T Intellectual Property I, L.P., Reno, NV (US)

( * ) Notice: Subject to any disclaimer, the term of this patent is extended or adjusted under 35 U.S.C. 154(b) by 591 days.

(21) Appl. No.: 12/233,025

(22) Filed: Sep. 18, 2008

(65) Prior Publication Data
US 2010/0069109 A1 Mar. 18, 2010

(51) Int. Cl.
*H04Q 7/20* (2006.01)
(52) U.S. Cl. ......... 455/522; 455/68; 455/69; 455/426.1; 455/500; 455/517; 370/310; 370/328; 370/336; 370/345; 370/406
(58) Field of Classification Search .......... 455/522, 455/500, 517, 68, 69, 127.1, 426.1, 426.2, 455/422.1, 403, 550.1, 13.1, 12.1, 445, 254; 370/310, 328, 329, 336, 345, 406
See application file for complete search history.

(56) References Cited

U.S. PATENT DOCUMENTS

| 6,263,196 | B1 * | 7/2001 | Miyashita ................. 455/161.1 |
| 7,197,326 | B2 | 3/2007 | Acampora |
| 2006/0084444 | A1 | 4/2006 | Kossi et al. |
| 2008/0188256 | A1 * | 8/2008 | Wu et al. ....................... 455/522 |

OTHER PUBLICATIONS

"RTEQ: Modeling and Validating Infinite-State Hard-Real-Time Systems," Hall, AT&T Labs Research, ASE 2007, Atlanta, GA, Nov. 2007.
"A Two-Level Quality of Service Scheme for Collision Based Mobile Ad Hoc Networks," Hall et al., IEEE, 1-4244-1513, 2007.

* cited by examiner

*Primary Examiner* — Keith Ferguson
(74) *Attorney, Agent, or Firm* — Woodcock Washburn LLP

(57) ABSTRACT

Network devices are disclosed where transmission of information over a wireless channel by a device is prevented or allowed during a particular time period based upon a classification of the wireless electronic device, and whether the particular time period is associated with that classification.

26 Claims, 9 Drawing Sheets ial interference problems within a communication range by restricting the transmission of long range and short range devices to corresponding and mutually exclusive times: a long range tier time period and a short range tier time period. Long and short range tier time periods can alternate along the time continuum as illustrated at FIG. 5, which is discussed further herein. Thus, transmission is permitted in an alternating manner for long and short range devices.

TIME-MULTIPLEXED, TWO TIER WIRELESS DEVICE AND METHOD THEREFOR

BACKGROUND

1. Field of the Disclosure

The present disclosure relates generally to wireless devices, and more particularly to the transmission of data by wireless devices.

2. Description of the Related Art

A data communication network can transfer information between two or more electronic devices. The data communication network can encode the information using electrical signals that are conducted by wires, or encode the information using electromagnetic waves to provide a wireless or optical network. The data communication network architecture operates within the constraints of a network protocol, which specifies how the electronic devices exchange the information.

A network can include a base station or access point to manage network communications, or it can operate as an ad hoc network. An ad hoc wireless network is decentralized and requires no base station. Instead, each electronic device discovers other devices within radio-transmission range, and either transfers information directly between two devices, or relays the information from one device to another, until the desired transfer is completed. The latter is referred to as a multi-hop ad hoc network.

Minimal configuration and quick deployment make ad hoc networks advantageous for communications needed during emergencies including natural disasters or military conflicts, as well as in other deployment scenarios in relatively unstructured environments, such as military training in realistic terrain. However, the network capacity provided by a conventional ad hoc wireless network can be limited by radio interference and congestion.

BRIEF DESCRIPTION OF THE DRAWINGS

The present disclosure may be better understood, and its numerous features and advantages made apparent to those skilled in the art by referencing the accompanying drawings.

Skilled artisans appreciate that elements in the figures are illustrated for simplicity and clarity and have not necessarily been drawn to scale.

DETAILED DESCRIPTION

An ad hoc network protocol is disclosed where transmission of information over a wireless channel by a communication device of the ad hoc network is prevented or allowed during a particular time period referred to as a tier time period, based upon a classification of the wireless electronic device, whether the particular time period is associated with that classification, and whether the particular message to be transmitted is associated with the particular tier.

Figure 1:
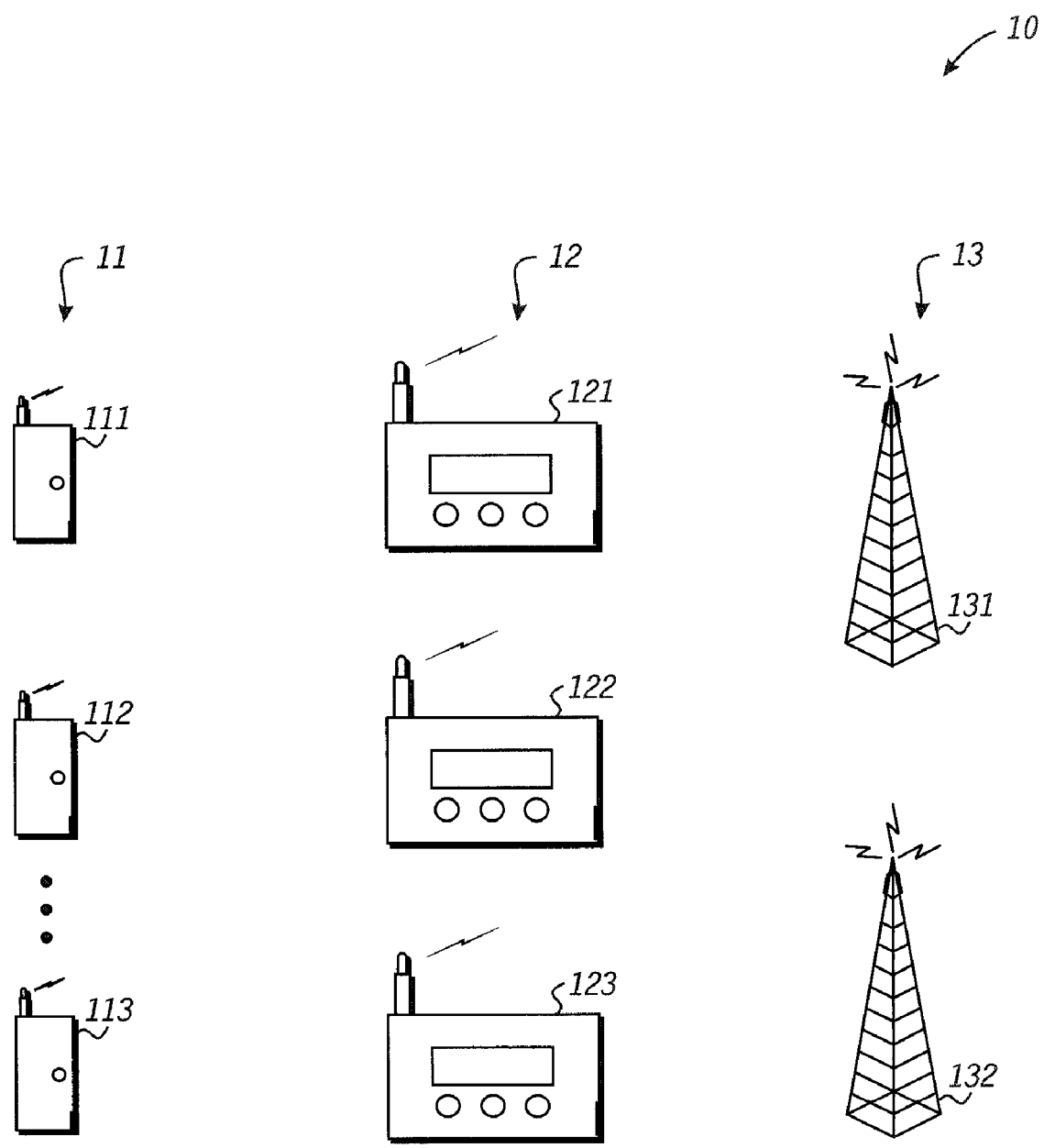
FIG. 1 illustrates wireless electronic devices included in an ad hoc network according to an embodiment of the present disclosure.

FIG. 1 illustrates wireless electronic devices included in an ad hoc network 10 according to an embodiment of the present disclosure. Ad hoc network 10 observes a protocol where the operation of wireless electronic devices in multiple classes of operation is time-multiplexed. By example, network 10 supports two classes of operation for wireless devices: short range and long range. A device operating in the short range class is referred to as short range device. A device operating in the long range class is referred to as long range device. In the embodiment disclosed herein, short range devices provide relatively short communication range as compared to the communication range of a long range device. For example, short transmitting range or receiving range can result from limited supply power or transmit power, or due to small antenna size. A short range device can include a hand held device. For purpose of discussion it is assumed that long range devices can transmit signals at greater power levels than short range devices. A long range device may be mobile, such as associated with a vehicle, and can include an external power source or a larger antenna than the short range devices.

Network 10 includes mobile wireless devices 11 having limited transmitting power, including representative devices 111, 112, and 113, mobile wireless devices 12 capable of transmitting at a greater power level than mobile wireless devices 11, including representative devices 121, 122, and 123, and immobile wireless devices 13 capable of transmitting at the same or greater power as devices 11, including representative devices 131 and 132.

While the range of devices can vary, in one embodiment short range devices reliably transmit and receive wireless communications from other short range devices within a range of approximately 500 meters and long range devices reliably transmit and receive wireless communications within a range of approximately 5000 meters. As previously noted, operating both long range and short range devices in the same localized region can result in interference, for example when a long range device transmits a signal that interferes with the transmit signal of a short range device because the long range device cannot detect the short range device's signal due to its low transmit power. Methods disclosed herein reduce poten- The term short range device as used herein can refer to either a short range only device or a mixed range device transmitting during the short range tier. A short range only device is a device that only transmits messages during the short range tier, while a mixed range device is one that transmits messages sometimes during the short range tier and sometimes during the long range tier. The term long range device as used herein can refer to either a long range only device or a mixed range device transmitting during the long range tier. A long range only device is a device that only transmits messages during the long range tier, while a mixed range device is one that transmits messages sometimes during the long range tier and sometimes during the long range tier. In one embodiment, whether a mixed range device transmits a message in the long range tier or the short range tier is based upon information associated with the message being sent as will be discussed further herein.

Wireless devices 11, 12, and 13 each support unicast and geocast wireless network protocols. A unicast transmission is a transmission based upon a unicast network protocol, whereby information is sent using data packets identifying a single destination, which can be specified by a unique parameter such as an identity (ID) value or internet protocol (IP) address. A data packet can include a "wrapper" within its payload portion, which encapsulates other data packets. Devices included in the network can relay the information from device to device in order to provide the information to the desired destination device.

A geocast network protocol refers to the delivery of data packets to one or more destination devices in a network, where destination devices are identified by being within a geographical region specified in the header of the data packet, and referred to as a geocast destination. The geographical region can be circular, specified using a location and a radius. The region can also be specified using multiple locations, the set of which specify an encompassing polygonal region, including shapes of zero, one, two, three, or more dimensions, time-varying shapes, and the like. Devices included in the network can relay the information from device to device in order to provide the information to all devices included within the specified geographical region.

Figure 2:
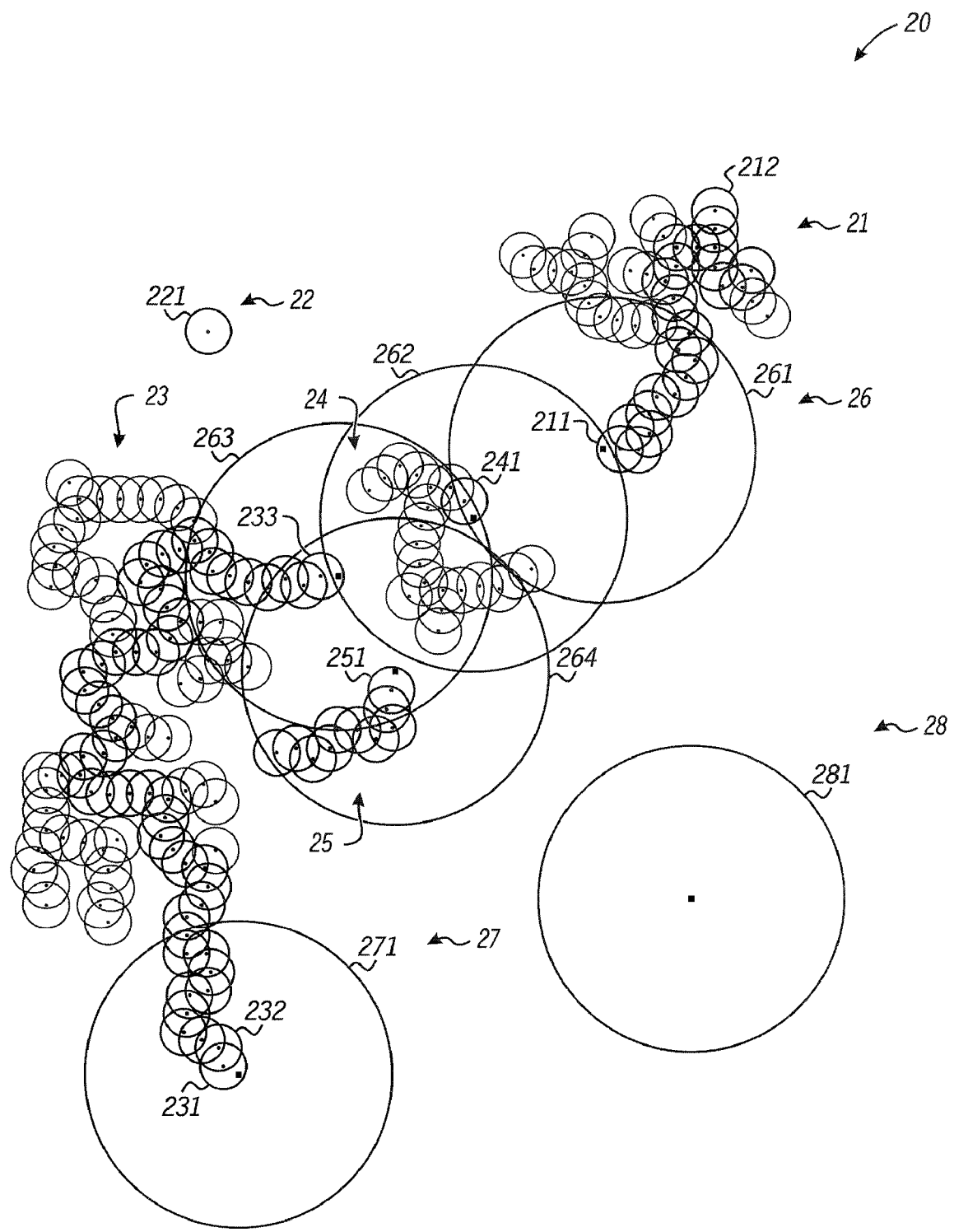
FIG. 2 includes a cartographical view of short range and long range wireless electronic devices included in an ad hoc network according to an embodiment of the present disclosure.

FIG. 2 includes a cartographical view showing an ad hoc network 20 having short range and long range wireless electronic devices according to an embodiment of the present disclosure. For purposes of discussion, each device is presumed to be centered within an indicated circle, while the perimeter of the circle indicates a typical reliable transmit range of the device. Large circles are intended to represent long range devices and small circles are intended to represent short range devices. Therefore, when a circle that represents the communication range of one device, such as the circle representing device 231, overlaps the center of a circle representing another device's communication range, such as the circle representing device 232, then the device 231 device is in suitable proximity to reliably exchange information with device 232.

Ad hoc network 20 includes communication groups 21 through 28, each group including one or more devices. Groups 21, 22, 23, 24, and 25 are short range groups of short range devices that can communicate—using the short range tier time periods. Groups 26, 27, and 28 are groups of long range devices that can communicate—using the long range tier time periods. Short range group 21 generally includes a set of short range devices, including representative devices 211 and 212. Short range group 22 includes a single short range device 221, which is not within communication range of another device, and is therefore not a part of ad hoc network 20. Short range group 23 generally includes a set of short range devices, including representative devices 231, 232, and 233. Short range group 24 generally includes a set of short range devices, including representative device 241. Short range group 25 generally includes a set of short range devices, including representative device 251. Long range group 26 includes a set of long range devices, including devices 261, 262, 263, and 264. Long range groups 27 and 28 each include a single long range device, 271 and 281, respectively. Long range device 281 is not within communication range of another device, and is therefore not a part of ad hoc network 20.

Heuristic retransmission rules control the relay of information from one device to other proximate devices. A unicast transmission can be relayed from the sender to the specified recipient by a number of intermediate devices. A geocast transmission can be relayed from the sender to all devices located within a specified geographical region.

Figure 3:
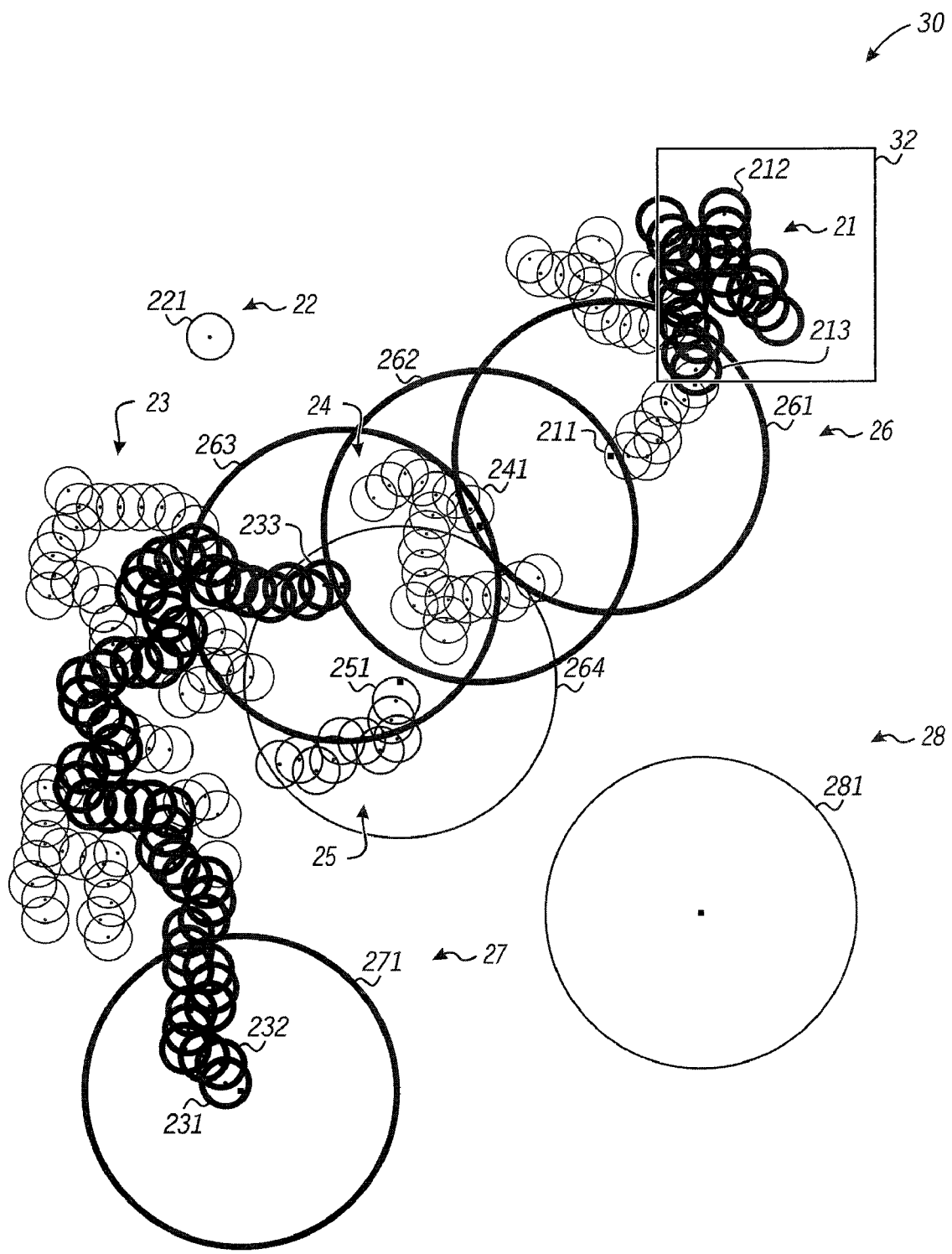
FIG. 3 includes the cartographical view of FIG. 2 with specific wireless electronic devices highlighted to illustrate information transfer by the ad hoc network using a geocast protocol.

FIG. 3 includes a cartographical view showing an ad hoc network 30, including the same devices included at FIG. 2, and illustrates devices in bold that are involved in a geocast transmission. For example, device 231 can initiate a geocast transmission specifying a geocast destination 32. The devices used to communicate the geocast transmission are shown in bold, and include devices 271 231, 233, selected intermediate devices between devices 231 and 233, 263, 262, and 261, and devices within the geocast destination 32, including device 212.

A device that is located within the communication range of another device can exchange information with that other device. Information can be relayed from one device to another device, and to yet another device until the appropriate destination device or devices have been reached. When a device first receives a geocast transmission, the device rebroadcasts the information. A geocast transmission can be used to send information to all devices located within the confines of a specified geographical region. For example, long range device 271 can initiate a geocast transmission, during a long range tier time period, specifying region 32. The transmission can be relayed by short range devices 231, 232, and onward to device 233 during short range tier time periods as indicated by the bold devices of FIG. 3.

Short range device 233 can retransmit the geocast information which is received by long range device 263, and the geocast information can be further relayed by long range devices 262 and 261 during long range tier time periods. Note that long range device 263 can receive information from short range device 233 by listening to messages transmitted over the short range tier and retransmitting them over the long range tier. The retransmission initiated by long range device 261 can be received by any of the short range devices within the range of long range device 261. However, it is presumed that while device 211 received the transmission from long range device 261, it was not involved with re-transmitting the message to short range device 213, as short range device 213 received the message directly from long range device 261. Therefore, device 211 is not part of the communication path from device 271 to devices within region 32. Note however, that communications in the opposite direction would necessarily include short range device 211 in order to communicate with long range device 261. Device 213 retransmits the communication received from long range device 261 to facilitate communicating the information to all devices located within region 32 (indicated by bold circles located within region 32).

Figure 4:
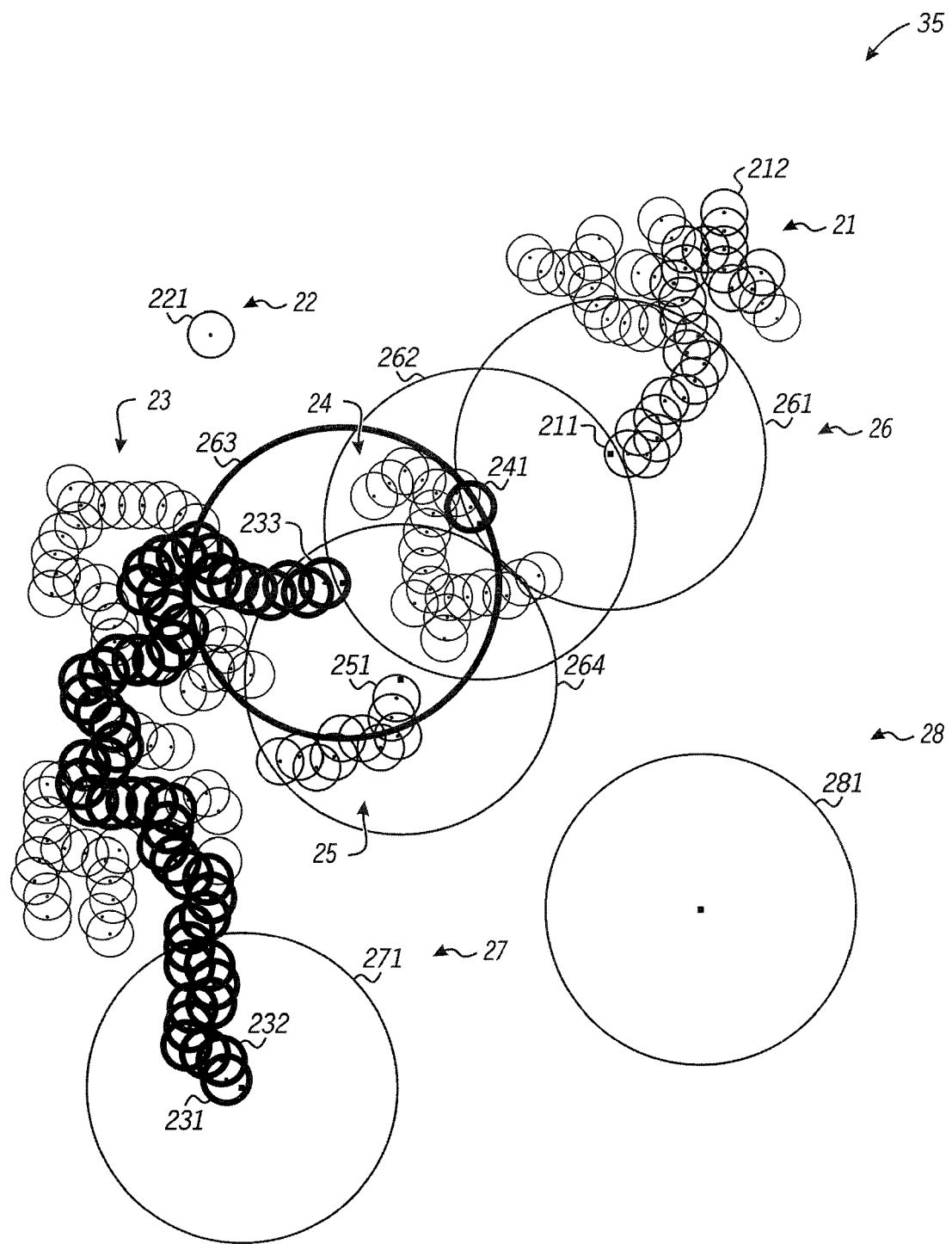
FIG. 4 includes the cartographical view of FIG. 2 with specific wireless electronic devices highlighted to illustrate information transfer by the ad hoc network using a unicast protocol.

FIG. 4 includes a cartographical view showing an ad hoc network 35, including the same devices included at FIG. 2, and illustrates devices in bold that are involved in a unicast transmission. For example, device 231 can initiate a unicast transmission specifying device 241 as a destination. Circles representing the communication range of specific devices used to complete the unicast transmission are shown in bold, including devices 231, 232, 233, selected intermediate devices between devices 232 and 233, and devices 263 and 241. In this example, short range device 231 initiates a unicast transmission of information, identifying device 241 as the recipient. Device 232 is within reception range of device 231, and rebroadcasts the information received from device 231. Successive short range devices, such as those shown in bold, can relay the information to short range device 233 during short range tier time periods. It will be appreciated that the particular sequence of relaying devices can be determined using any routing techniques, including one of many routing techniques well known in the art for establishing routes through an ad hoc network, including as reverse path forwarding.

Short range device 233 can rebroadcast the information, which can be received by long range device 263. Long range device 263 can rebroadcast the information during a long range tier time period. The designated recipient, short range device 241, is within communication range of long range device 263, and can therefore receive the information. Note that whereas circles representing specific devices involved in transmitting the unicast information from device 231 to 241 are shown in bold, other devices receive and repeat the transmission.

Device 241 can optionally acknowledge receipt of the information by issuing an acknowledgment transmission specifying device 231 as the destination. The acknowledgment can be relayed back to device 231 using a unicast transmission by the same or a different set of intermediate devices that relayed the original information. For example, the acknowledgement can be relayed by the same devices that relayed the original information, but in a reverse order, by specifying these particular intermediate devices using successive unicast transmissions wherein each intermediate device specifies it's immediately adjacent device along the original path.

By transmitting during time periods associated with specific tiers, problems associated with conventional ad hoc wireless networks can be overcome, such as limited network transmission capacity due to interference between individual devices included in the network. For example, transmissions initiated by long range device 263 can interfere with transmissions initiated by short range devices included in short range group 24, because these short range, low power, devices are within the transmission range of long range, high power, device 263. In particular, the short range devices may at an illustrative time instant be engaged in exchanging information, yet due to its distance, the long range transmitter may not hear this exchange and start its own transmission, giving rise to interference with both the first short range exchange as well as leading to the long range transmission being un-receivable at the short range parties who are already exchanging information. Interference issues can be partially addressed by using one frequency channel for short range tier devices and another frequency channel for long range tier devices, but adjacent channel interference can still occur. Moreover, two channels may not be available in a particular frequency spectrum or at particular geographic areas. The cost of dual frequency wireless devices is also greater than single channel devices. Therefore, methods that support the use of a single operating frequency can be advantageous.

Figure 5:
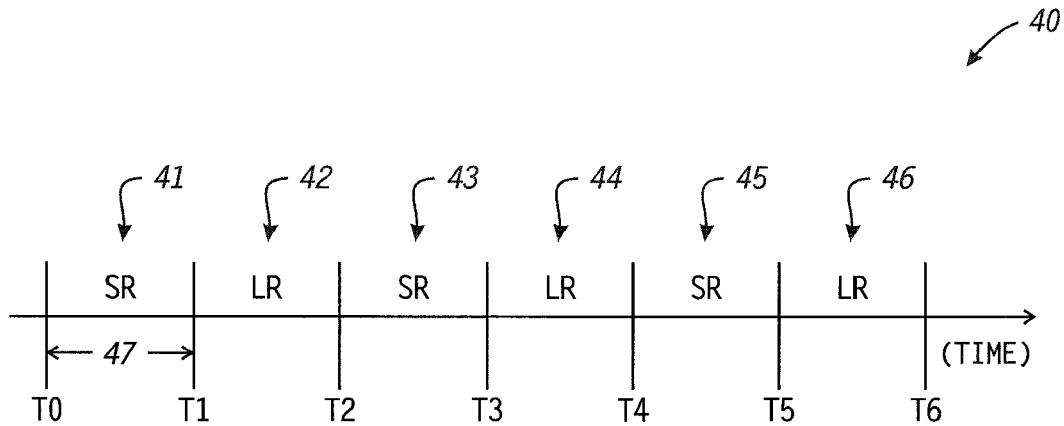
FIG. 5 includes a timing diagram illustrating time-multiplexed short and long range tier time periods according to an embodiment of the present disclosure.

FIG. 5 includes a timing diagram 40 illustrating time-multiplexed short and long range tier time periods according to an embodiment of the present disclosure. A tier time period can also be referred as a "slice." The horizontal axis of timing diagram 40 represents time, and includes time references labeled "T0," "T1," "T2," "T3," "T4," "T5," and "T6." A slice 41 begins at time T0 and continues until time T1. A slice 41 begins at time T0 and continues until time T1. A slice 42 begins at time T1 and continues until time T2. A slice 43 begins at time T2 and continues until time T3. A slice 44 begins at time T3 and continues until time T4. A slice 45 begins at time T4 and continues until time T5. A slice 46 begins at time T5 and continues until time T6. Alternating slices 41, 43, and 45 are associated with short range tier device transmission, and alternating slices 42, 44, and 46 are associated with long range tier device transmission. During short range tier time periods, device transmit power can be set to a predetermined level. Generally, long range tier slices are reserved for transmissions at greater power levels, however long range devices can be configured to transmit at a differing power levels device during a long range tier slice if desired. Similarly, short range tier slices are generally reserved for transmissions at lower power levels, however short range devices can be configured to transmit at a differing power levels device during a short range tier slice if desired. A mixed range device can be configured to transmit during either a long range tier time period or during a short range tier time period. In one embodiment a mixed range device is not permitted to transmit at a high power (and thus long range) during a short range tier time period.

Each tier slice can be of the same duration, the duration illustrated by a time interval 47. Short range tier slices can also be different than long range tier slices, and the duration of either can be individually programmable. For the purpose of discussion, the duration of time period 47 is assumed to be 100 milliseconds. Each wireless device can include a global positioning system (GPS) receiver that can provide each device with a highly accurate reference clock, and thus allow each device to determine which tier time period is active at any particular time. The GPS receiver typically operates at a different frequency (channel) than that used for network transmissions.

Because there may be many wireless devices located in close proximity to one another, conflicts between same-tier devices can still occur. For example, referring again to FIG. 3, when a geocast transmission targeting a region associated with geocast destination 32 is received at all of the devices located in region 32, those devices may be configured to acknowledge receipt of the transmitted information or retransmit the transmission to other devices. Therefore, protocol techniques can be implemented to desynchronize and prioritize individual transmissions within each tier time period. For example, preemption intervals can temporarily prevent a device from transmitting information that is otherwise ready to be transmitted. For example, a preemption interval can prevent a backoff time from elapsing, which will be further described with reference to FIG. 6. Pending transmissions are allowed when the backoff time has elapsed.

Figure 6:
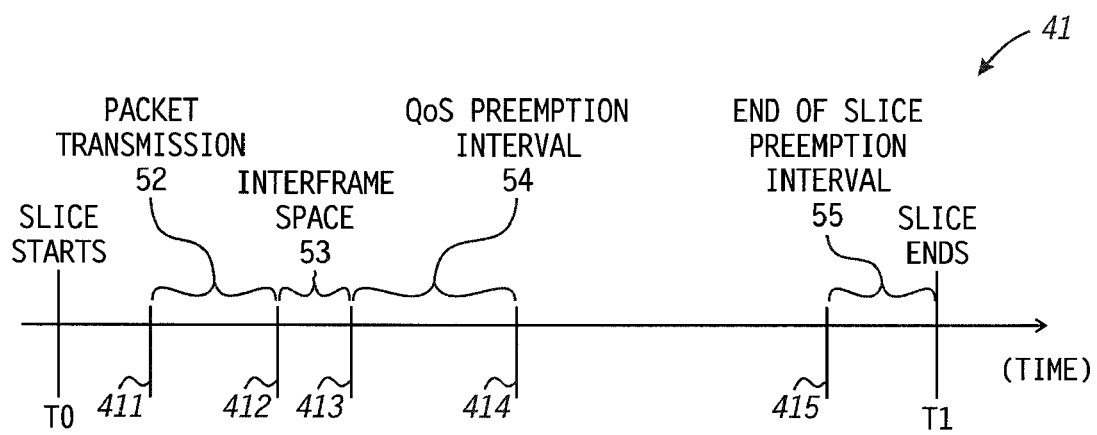
FIG. 6 includes a timing diagram illustrating a tier time period of FIG. 4 in greater detail.

FIG. 6 includes a timing diagram illustrating a single time period, such as slice 41 of FIG. 5, in greater detail. The horizontal axis represents time. Slice 41 begins at time reference T0, ends at time reference T1, and includes five intermediate time references 411, 412, 413, 414, and 415. A time interval 52, between time references 411 and 412, represents an interval of slice 41 during which the local wireless medium is busy because a packet is being transmitted by a proximate device. The interval between time reference 412 and 413 is identified as an interframe space 53. The interval between time reference 413 and 414 is identified as a quality of service (QoS) interval 54. The interval between time reference 415 and the end of slice 41 at time reference T1 is identified as an end of slice (EoS) preemption interval 55. FIG. 6 can also represent a long range tier time period, such as slice 42.

A wireless network medium is said to be busy with respect to a particular device, if a transmission by a different wireless device over the wireless network medium is detected by the particular device. For example, referring to FIG. 2, if short range wireless device 231 transmits a packet of information, the network medium will be busy with respect to devices 271 and 232 as they are within range to reliably receive the transmission. However, it will be appreciated that other devices proximate to device 231 may be able to detect the transmission from device 231, even though not in a reliable manner, thereby resulting in their network medium also being busy. The network medium is therefore busy at least with respect to devices 231, 232, and 271 during time slice 41 due to a transmission by device 231. Wireless device 233 is not within range to receive the transmission from device 231, and therefore the wireless network medium is not busy with respect to device 233 because of the transmission from 231. However, the network medium may be busy with respect to device 233 due to a different transmission from a device having a transmission range that does encompass device 233.

Immediately following a time that a local network medium is busy due to a packet transmission, an interframe space is implemented at those devices within range of the transmission. During the interval of time designated as an interframe space, an acknowledgement packet can be implemented by the recipient of a transmission. For example, if device 231 completes a unicast transmission of packet 52 to device 232, device 232 can transmit an acknowledgement to device 231 during interframe space time interval 53, but typically will not initiate another type of transmission during this time. A QoS preemption interval, such as QoS preemption interval 54, is implemented following each interframe space interval. A QoS preemption interval can be used to prioritize pending communications between wireless devices. For example, a device that has information that is identified as being low priority would not attempt to transmit during the QoS preemption interval, since the backoff time of the device would not be allowed to continue elapsing during the QoS preemption interval. However, a device having information that is identified a being high priority would potentially be allowed to transmit during the QoS preemption interval, since the backoff time of the device would continue to elapse during the QoS preemption interval. After QoS preemption interval 54 has elapsed, the backoff time continues to elapse at devices having low priority information, e.g., packets, and each device is allowed to transmit information when its respective backoff time has elapsed. Note that an interframe space and a QoS preemption interval are only implemented subsequent to the time that the local medium was busy.

During EoS preemption interval 55, no new packet transmission can be initiated. The duration of EoS preemption interval 55 is dependent upon the time required to transmit a desired packet in addition to the time required to receive an acknowledgement. The EoS preemption interval assures that there is sufficient time remaining in a tier time period to transmit a packet and to receive an acknowledgement in reply.

An interframe space, a QoS preemption interval, an EoS preemption interval, and the interval during which other packets are being transmitted are periods of time during which a device can delay transmission. Multiple packets can be transmitted during a tier slice as long as the described preemptions are observed.

Wireless transmissions can lead to many devices in a local area attempting to retransmit a packet, or attempting to transmit unicast acknowledgements, at nearly the same time. As previously mentioned, a backoff time is used to determine when a device can transmit pending information. While the backoff time can be determined in any manner, for purposes of discussion it is presumed to be determined pseudo-randomly, and referred to as a "pseudo-random backoff time," which desynchronizes packet transmission attempts between devices and thus reduces contention issues that can result from near-simultaneous transmissions. The pseudo-random backoff time is a pseudo-random amount of time, expressed as a backoff count, representing the backoff time during which a device must wait before initiating a transmission. Each device has a unique ID and a pseudo-random backoff time can be calculated based in part by this unique ID. The backoff time can be expressed as $$\text{Rollingbackoff} = (20\text{ us})((\text{DeviceID} + \text{Time}) \bmod N),$$

where, 20 uS represents a backoff multiplier, DeviceID is the unique ID assigned to each wireless device, Time is the current time, and N is an integer representing the largest number of 20 uS intervals the backoff time can represent. The backoff multiplier can be adjusted based upon specific application requirements, and some types of transmissions may use a different backoff multiplier than other types of transmissions.

When a device has information that needs to be transmitted, including information that it has received and should retransmit, the information is placed into a data queue. Individual queues can be provided for information of differing priority. Whenever information in the data queue is ready for transmission, a pseudo-random backoff time is calculated and stored at a backoff counter of the device as a value to be decremented. The backoff time continues to elapse, e.g., the backoff counter is decremented by a clock signal, until the backoff time is elapsed, e.g., the counter is decremented to zero, at which time the information at the top of the device's data queue can be transmitted.

The decrementing of the backoff counter continues except during interframe space 53, QoS preemption interval 54, and EOS preemption interval 55, during which the backoff time is tolled, e.g., the backoff counter is not decremented. The backoff time is also tolled while the wireless medium is busy (another transmission in the local reception area is detected) or during the time that a tier time period of the wrong tier is active. Otherwise, the backoff time continues to elapse until it is elapsed, at which time the device can transmit its packet of information.

Figure 7:
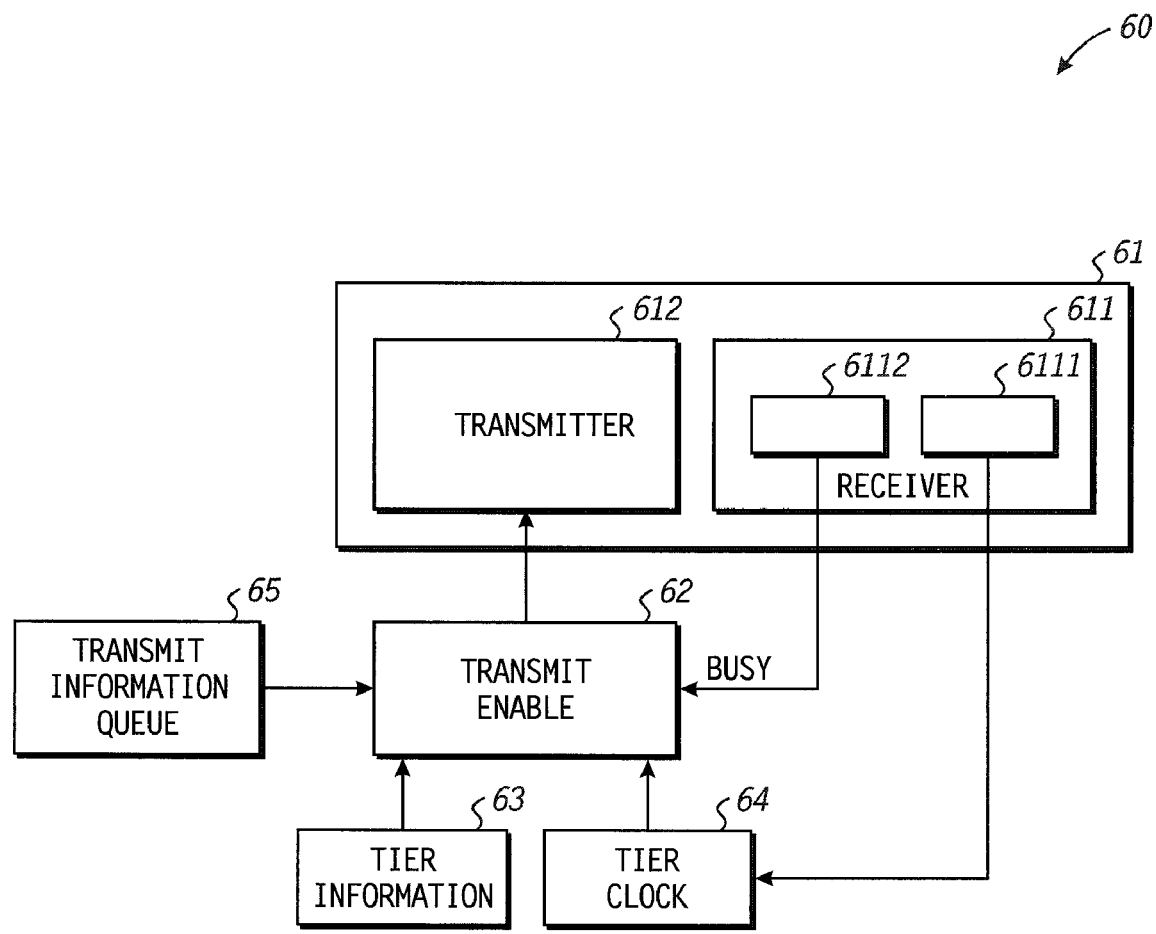
FIG. 7 includes a block diagram illustrating a wireless electronic device according to an embodiment of the present disclosure.

FIG. 7 includes a block diagram illustrating a wireless device 60 according to an embodiment of the present disclosure. Wireless device 60 includes a transceiver 61, a transmit information queue 65, a transmit enable module 62, a tier clock module 64, and tier information module 63. Transceiver 61 further includes a transmitter 612 and a receiver 611. Receiver 611 further includes a network receiver 6112 and a GPS receiver 6111.

Transmit enable module 62 has an output connected to an input of transmitter 612, an input connected to transmit information queue 65, an input connected to network receiver 6112. Tier clock module 64 has an input connected to GPS receiver 6111, and an output connected to transmit enable module 62. Tier information module 63 has an output connected to transmit enable module 62. Portions of the functionality associated with the blocks included in wireless device 60 can be implemented in software, firmware, hardware, or combinations thereof.

Wireless device 60 can represent a long range device that can transmit and receive during a long range tier time period, a short range device that can transmit and receive during a short range tier time period, or a mixed range tier device that can be configured to transmit and receive during both short range and long range tier time periods. Transmitter 612 can transmit information when directed to do so by transmit enable module 62. Receiver 6112 can receive information from the network. Receiver 6112 asserts signal BUSY when the wireless network medium is being used, such as when another wireless device within communication range is transmitting. GPS receiver 6111 can receive time information from GPS satellites in Earth orbit, and provides this time information to tier clock module 64. Tier clock module 64 maintains a time for the device and uses the GPS information to adjust the current time maintained at tier clock module 64 to a substantially high degree of accuracy. Tier information 63 can identify and configure wireless device 60 as a short range only device, long only range, or mixed range device, and identify how to determine tier time slice start and end times for a current network configuration. Transmit enable module 62 receives the current time from tier clock 64 and tier information 63 and determines current tier type of the current slice and the time location within the current slice for device 60. Thus, wireless device 60 can determine when it is permitted to initiate a transmission based upon intervals previously discussed. Tier information 63 can be programmable so that tier time period durations and start times can be modified if desired. Device information at tier information module 63 relating to device 60 can be fixed indicating either a long range device or a short range device, or it can be modified to reconfigure wireless device 60 from one tier to another.

For the purpose of example, suppose that wireless device 60 is a mixed range device, which can be indicated by tier information 63 that has information ready for transmission over the short range tier. Tier information 63 can identify short range tier time periods as beginning on even numbered 100 mS fractions of a second of the real time, while long range tier time periods are identified as beginning on odd numbered 100 mS fractions of a second of the real time. Transmit enable module 62 can receive the current time from tier clock 64 and thus determine if a current time period is associated with the short range tier or the long range tier, and how much time is remaining before the end of the currently active tier time period. If the short range tier time period is active and there is sufficient time remaining in the time slice to complete transmission of the information and receive an acknowledgment receipt, wireless device 60 can be configured to commence with transmission of the information using transmission parameters consistent with transmitting information over a short range tier.

Transmit information queue 65 notifies transmit enable module 62 when wireless device 60 has information to transmit, and supplies that information to transmit enable module 62. Transmit information queue 65 can include individual and distinct queues to differentiate high and low priority information. Pending high priority information can be transmitted first, and transmission of lower priority information can be postponed until the transmission of high priority information is complete. Transmit enable module 62 determines whether the transmission can commence based on tier information 63, tier clock 64, whether the medium is busy, whether any preemption interval is active, and whether the device's backoff time has elapsed. Transmit enable module 62 provides the information to transmitter 612 when transmission can begin.

Figure 8:
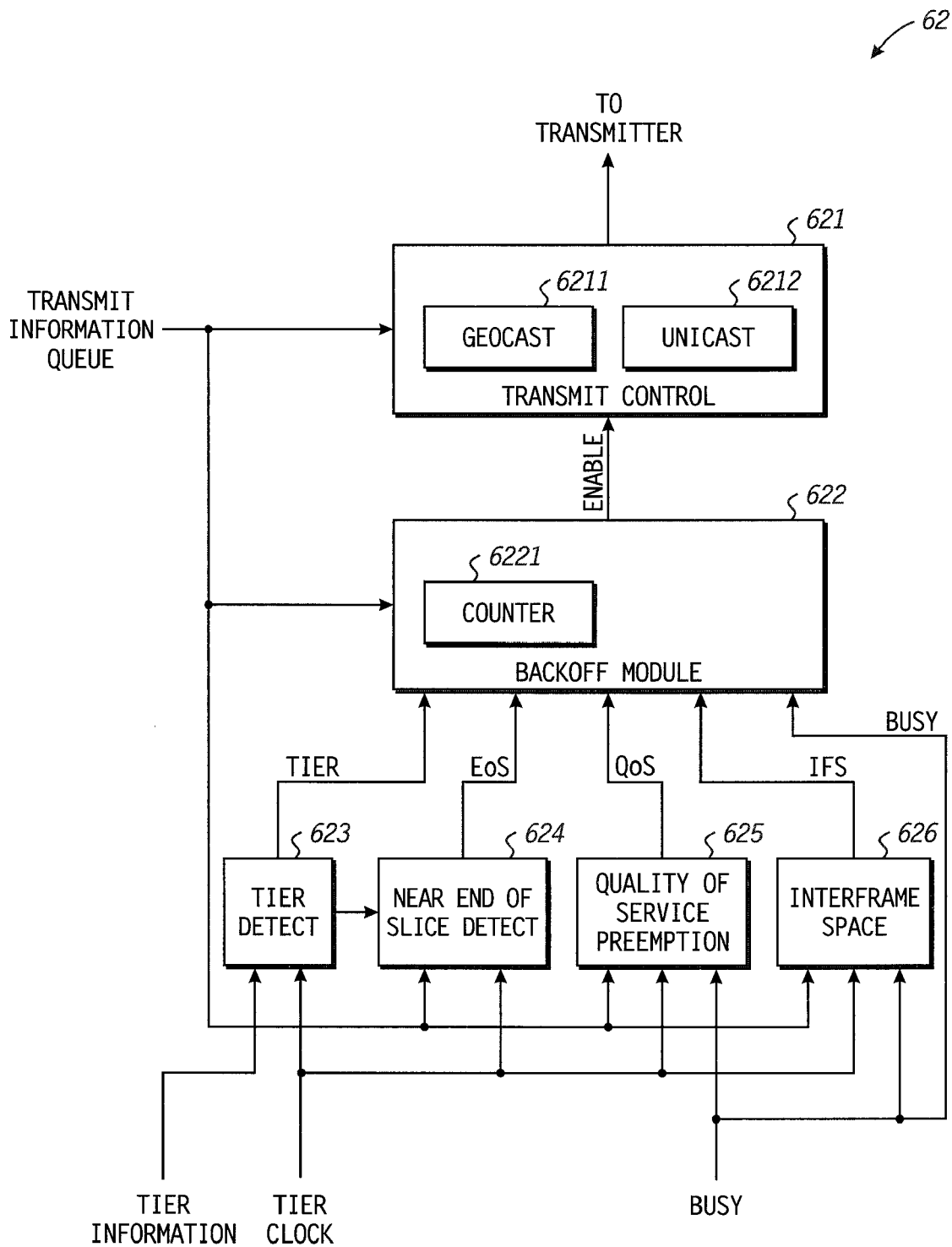
FIG. 8 includes a block diagram illustrating a transmit enable block of FIG. 6.

FIG. 8 includes a block diagram illustrating a specific embodiment of a transmit enable module 62 of FIG. 7. Transmit enable module 62 includes transmit control module 621, backoff module 622, tier detect module 623, near end of time period detect module 624, quality of service preemption module 625, and interframe space module 626. Transmit control module 621 further includes a geocast control module 6211 and a unicast control module 6212. Backoff module 622 further includes a backoff counter 6221.

Transmit control 621 has an input connected to transmit information queue 65, an input connected to backoff module 622, and an output connected to transmitter 612. Backoff module 622 has an input connected to transmit information queue 65, an input connected to tier detect module 623, an input connected to near end of slice detect module 624, an input connected to quality of service preemption module 625, an input connected to interframe space module 626, and an output to provide a signal labeled "ENABLE," connected to transmit control 621. Tier detect module 623 has an input connected to tier clock 64, an input connected to tier information 63, and output connected to near end of slice detect module 624, and an output to provide a signal, labeled "TIER," connected to backoff module 622.

Near end of slice detect module 624 has an input connected to transmit information queue 65, an input connected to tier clock 64, an input connected to tier detect 623, and an output to provide a signal, labeled "EOS," connected to backoff module 622. Quality of service preemption module 625 has an input connected to transmit information queue 65, an input connected to tier clock 64, an input connected to network receiver 6112 to receive signal BUSY, and an output to provide a signal, labeled "QoS," connected to backoff module 622. Interframe space module 626 has an input connected to transmit information queue 65, an input connected to tier clock 64, an input connected to network receiver 6112 to receive signal BUSY, and an output to provide a signal, labeled "IFS," connected to backoff module 622.

Transmit control module 621 can prepare information provided by transmit information queue 65 for transmission by augmenting the information with other packet wrapper information, such as sender ID, recipient ID (for unicast protocol), geographical region (for geocast protocol), and checksum or encryption data. Geocast control module 6211 and unicast control module 6212 can provide information such as recipient geographic region and recipient ID, respectively. Transmit control module 621 can provide the complete information packet to transmitter 612, and backoff module 622 can assert signal ENABLE when control module 621 is authorized to commence with transmission of the information.

Backoff module 622 performs transmit desynchronization between a device and other devices by using backoff counter 6221 along with tier and preemption information received from tier detect module 623, near end of slice detect module 624, quality of service preemption module 625, and interframe space module 626. As previously discussed, backoff counter 6221 maintains a backoff time for a specific type of tier, such as a short range tier, and is set to a determined number, such as a pseudo-random number when information is received in the transmit information queue for transmission over its specific type of tier. For example, when information is received in the transmit information queue that is identified as information to be sent during a short range tier, backoff counter 6221 represents a counter associated with the short range tier that can be loaded with a value representing the backoff time. When backoff counter 6221 has decremented to zero, backoff module 622 can assert signal ENABLE to inform transmit control 621 that transmission can begin. The operation of backoff module 622 will be further described with reference to FIG. 9.

Tier detect module 623 receives current time information from tier clock 64 and tier information 63, and asserts signal TIER to indicate a whether the current time is associated with a short range tier or a long range. Backoff counter 6221 is decremented when the tier type it is associated with is the same as the current tier as indicated by the TIER signal Near end of slice detect module 624 can provide EoS information to backoff module 622. Tier detect module 623 can provide near end of slice detect module 624 with an indication of how much time is remaining in the active tier's time period. If there is not sufficient time before the end of a current tier time period to transmit information provided by transmit information queue 65, and to receive a reception acknowledgement, then signal EOS is asserted. Backoff counter 6221 is not decremented if signal EOS is asserted.

Interframe space module 626 can provide interframe space information to backoff module 622. An interframe space follows the detection of a local transmission on the wireless medium, as indicated by signal BUSY. The assertion of signal IFS indicates that the local wireless medium was previously busy (signal BUSY was active and became inactive), the interframe space interval has not elapsed, and the information provided by transmit information queue 65 is not an acknowledgment packet. Backoff counter 6221 is not decremented if signal IFS is asserted.

Quality of service preemption module 625 can provide QoS information to backoff module 622. A quality of service preemption interval follows all interframe space intervals. The assertion of signal QoS indicates that information can not yet be transmitted because the information provided by transmit information queue 65 is not high priority information and the QoS preemption interval has not elapsed. Signal QoS is not asserted if the information provided by transmit information queue 65 is high priority information even if the QoS preemption interval has not elapsed. Signal QoS is not asserted if the QoS preemption interval is not active.

Figure 9:
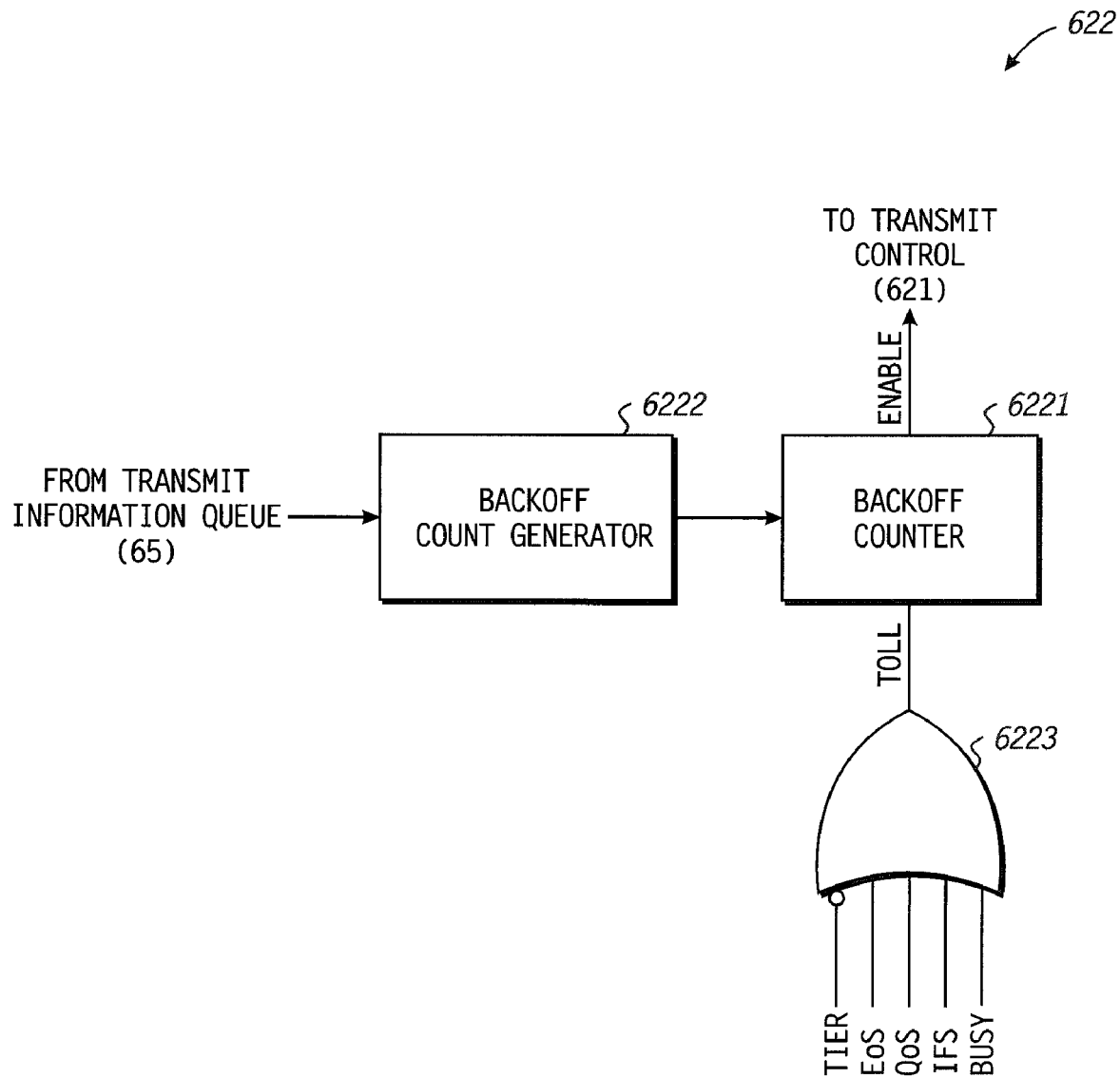
FIG. 9 includes a partial block and partial schematic diagram illustrating a backoff module of FIG. 7.

FIG. 9 includes a partial block and partial schematic diagram illustrating backoff module 622 of FIG. 8. Backoff module 622 includes backoff counter 6221, backoff count generator 6222 and a module represented as OR gate 6223. Backoff count generator 6222 has an input connected to transmit information queue 65, and an output. Backoff counter 6221 has an input connected to the output of backoff count generator 6222, an input connected to OR gate 6223, and an output to provide signal ENABLE to transmit control module 621. OR gate 6223 has an input to receive signal TIER from tier detect module 623, an input to receive signal EoS from near end of slice detect module 624, an input to receive signal QoS from quality of service preemption module 625, an input to receive signal IFS from interframe space module 626, an input to receive signal BUSY from network receiver 6112, and an output to provide a signal, labeled "TOLL," to backoff counter 6221.

Backoff count generator provides a pseudo-random rolling backoff count to backoff counter 6221 when a request to transmit is received from transmit information queue 65. Backoff counter 6221 decrements the rolling backoff count as time elapses as long as signal TOLL is inactive. Decrementing of backoff counter 6221 is paused when signal TOLL is active. When backoff counter 6221 has decremented to zero, backoff counter 6221 asserts signal ENABLE to notify transmit control module 621 that transmission of the data provided by transmit information queue can begin. Signal TOLL is active when signal TIER is inactive, signal EoS is active, signal QoS is active, signal BUSY is active, or signal IFS is active.

Figure 10:
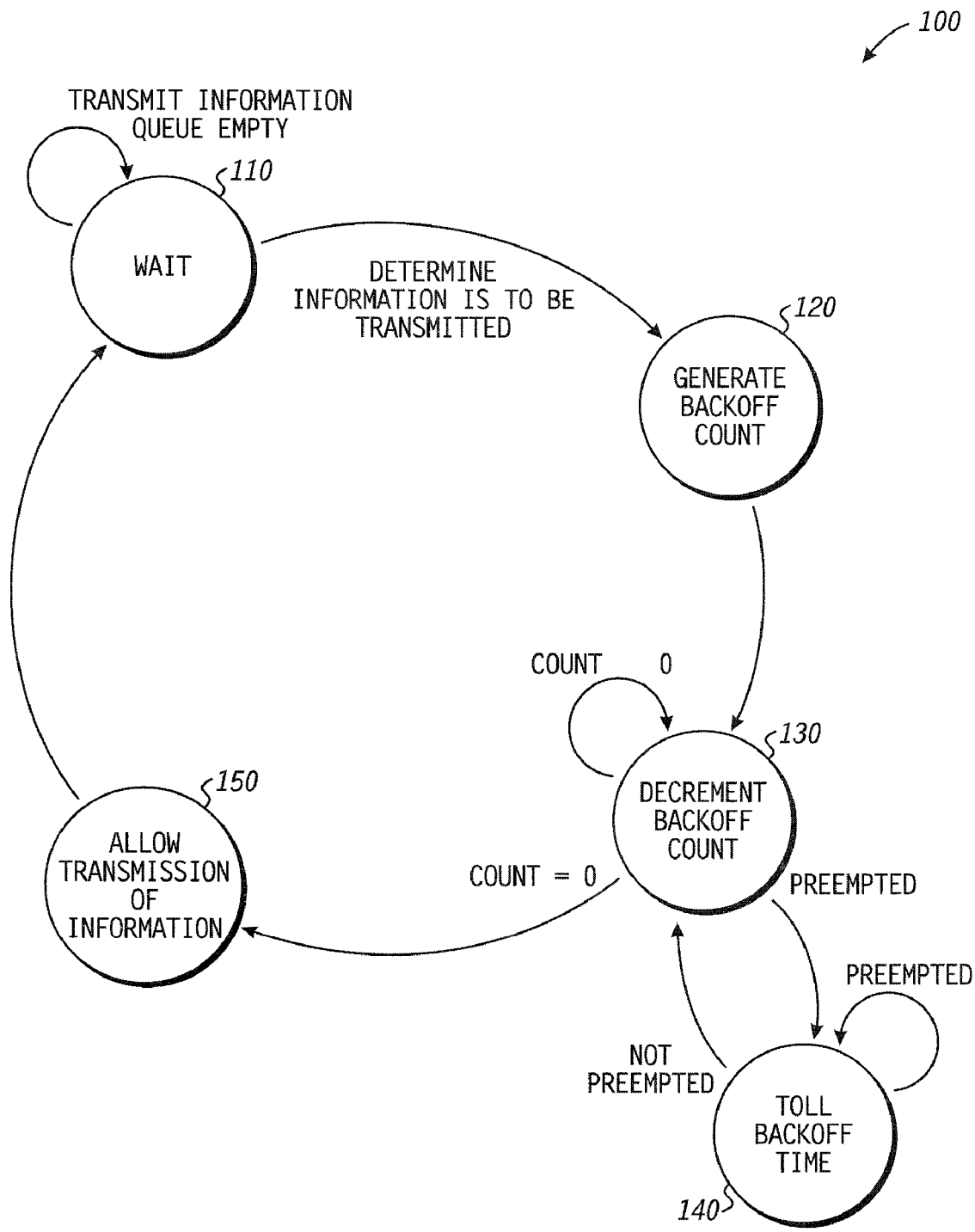
FIG. 10 includes a state diagram illustrating aspects of transmitter protocol capable of being implemented by the wireless electronic device of FIG. 6.

FIG. 10 includes a state diagram 100 illustrating aspects of transmitter protocol that can be implemented by the wireless electronic device 60 of FIG. 7. State diagram includes a WAIT state 110, a GENERATE BACKOFF COUNT state 120, a DECREMENT BACKOFF COUNT state 130, a TOLL BACKOFF TIME state 140, and an ALLOW TRANSMISSION OF INFORMATION 150.

Wireless electronic device 60 remains in WAIT state 110 as long as transmit information queue 65 is empty. A transition to GENERATE BACKOFF COUNT state 120 occurs when it is determined that information is available for transmission, indicated by a request received from transmit information queue 65. A count is generated by backoff count generator 6222 representing backoff time, and the machine transitions to DECREMENT BACKOFF COUNT state 130. It will be appreciated that for a mixed range device, whether the backoff time applies to the short range tier, or the long range tier is based upon an indicator associated with the information that is available to be transmitted. As long as device 60 is not preempted by the state of the network medium is not preempted, backoff counter 6221 decrements as time elapses. If at some time, a preemption becomes active, e.g., a preemption event occurs, the device transitions to TOLL BACKOFF TIME state 140 where the decrementing of backoff counter 6221 is paused. The machine remains in TOLL BACKOFF TIME state 140 until no preemptions are active, at which time the machine transitions back to DECREMENT BACKOFF COUNTER state 130. When backoff counter 6221 decrements to zero, the machine transitions to ALLOW TRANSMISSION OF INFORMATION state 150 and signal ENABLE is asserted notifying transmit control module 621 that the information provided by information queue 65 can be transmitted. It will be appreciated, that for a mixed range device, its operating parameters can be changed based upon the transmission type. For example, the amount of power at which a signal is to be transmitted can be changed based upon whether information is being transmitted during a short range tier time period or a long range tier time period.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

For example, specific examples of short and long range transmit and receive ranges have been illustrated, but the methods described in the present disclosure are applicable to other range-tiered network devices that have different range capabilities. A portion of the apparatus and methods described can be implemented in software or firmware. Therefore, illustrated signals and associated modules can be implemented as memory registers, variables, real-time interrupt signals, and the like. Also, while in one embodiment, the time slices can all be of the same duration, in other embodiments the time slices can have different durations. For example, all short range tier time periods can have a common duration and all long range tier time periods can have a common duration different from that of the short range tier time periods. In another set of embodiments, time period durations can vary for each tier as determined by a sequencing method that results in many different time slice durations over time.

Similarly, the specific device illustrated herein is illustrative, and not meant to be limiting. For example, the transmit enable module 62 may receive input signals from other modules (not shown) that augment its transmit decision capability based upon other received information. For example, in a preferred embodiment, the reception of transmissions of a geocast message prior to the node itself retransmitting said geocast message may cause the transmit enable module 62 of a device to cancel the transmission of its own copy of the message altogether.

Also, it will be appreciated that while a short range device has been described with respect to the power at which it transmits signals relative to a long range device, a short range device can also be described with respect to the sensitivity of its receiver. For example, a passive or active portion of a device can be selected depending upon a desired receive sensitivity. For example, a device can select between different antennae, different amplifiers, different noise filtering, and the like to adjust receive sensitivity based upon whether it is operating as a short range device or a long range device. Therefore, the device can set its receive sensitivity to a first sensitivity during a first time period, wherein during the first time period reception of signals transmitted at a first channel is permitted by the device using the first sensitivity level, and the device can set the its receive sensitivity to a second sensitivity during a second time period, wherein during the second time period reception of signals transmitted at the first channel is permitted by the device using the second sensitivity level.

While short range devices have been described as being handheld devices, and long range devices have been described as associated with vehicles, it will be appreciated that either class can be portable or non-portable depending on a specific network configuration.

A wireless device of any type can receive information during either a long range or a short range tier time period if the device is within a suitable range of the sending device. In an embodiment, a short range wireless device can receive and act on information received during a long range tier time period. A short range wireless device can be configured to either permit or to disallow reception of transmissions during the long range tier time period. A wireless device can also be configured to open and act on a packet that is not directly addressed to that device, or to open and act on a packet transmitted by a device belonging to a different tier Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method comprising:
    determining first information is to be transmitted over a first wireless channel, wherein the first information is to be transmitted at a first power level;
    preventing transmission of the first information over the first wireless channel during a first time period, wherein during the first time period transmissions at the first power level are not authorized to be transmitted; and
    allowing transmission of the first information over the first wireless channel during a second time period, wherein during the second time period transmissions at the first power level are authorized.

2. The method of claim 1 further comprising:
    determining second information is to be transmitted over a first wireless channel, wherein the second information is to be transmitted at a second power level;
    preventing transmission of the second information over the first wireless channel during a second time period, wherein during the second time period transmissions at the second power level are not authorized to be transmitted; and
    allowing transmission of the second information over the first wireless channel during the first time period, wherein during the first time period transmissions at the second power level are authorized.

3. The method of claim 2, wherein the first information and the second information are to be transmitted by a first device.

4. The method of claim 2, wherein the first information is to be transmitted by a first device and the second information is to be transmitted by a second device.

5. The method of claim 2 comprising:
    receiving the first information during the second time period; and wherein
    the second information is based upon the first information.

6. The method of claim 1 further comprising:
    determining a current time based upon time information received over a second wireless channel;
    adjusting a time maintained by a first device based upon the current time; and wherein
    preventing transmission of the first information during the first time period comprises determining occurrence of the first time period based upon the time maintained by the first device after adjusting.

7. The method of claim 6, wherein the timing information received over a second wireless channel is satellite transmitted.

8. The method of claim 1 further comprising:
    determining a backoff time for the first information in response to determining the first information is to be transmitted;
    wherein allowing transmission of the first information comprises allowing transmission of the first information during the second time period in response to the backoff time having elapsed.

9. The method of claim 8 further comprising:
    tolling the backoff time during the first time period, wherein the backoff time continues to elapse after the first time period.

10. The method of claim 9 further comprising:
    tolling the backoff time during the second period in response to other information being transmitted over the first wireless channel.

11. The method of claim 9 further comprising:
    tolling the backoff time during the second period in response to other information being transmitted over the first wireless channel; and
    tolling the backoff time during the second period following the transmission of the other information in response to the first information being associated with a lower priority indicator than a desired priority indicator.

12. The method of claim 1, wherein the first information includes a Geocast destination.

13. The method of claim 1, wherein the first information includes a unicast destination.

14. The method of claim 1, wherein the unicast destination is based upon a transmission path of a received geocast transmission.

15. The method of claim 1, wherein the method is a method of communicating over an ad hoc network.

16. The method of claim 1, wherein the method is a method of communicating over an ad hoc network.

17. A device comprising:
a memory to store information to be transmitted over a first wireless channel;
a transmit enable module coupled to the memory to determine first information at the memory is to be transmitted over a first wireless channel at a first power level, and to prevent transmission of the first information over the first wireless channel during a first time period, wherein during the first time period transmissions at the first power level are not authorized to be transmitted, and to allow transmission of the first information over the first wireless channel during a second time period, wherein during the second time period transmissions at the first power level are authorized.

18. The device of claim 17, where in the transmit enable module is to further determine second information is to be transmitted over the first wireless channel at a second power level, and to prevent transmission of the second information over the first wireless channel during a second time period, wherein during the second time period transmissions at the second power level are not authorized to be transmitted, and to allow transmission of the second information over the first wireless channel during the first time period, wherein during the first time period transmissions at the second power level are authorized.

19. The device of claim 17 further comprising:
a clock module coupled to the transmit enable module to determine a current time based upon timing information received over a second wireless channel; and wherein the transmit enable module prevents transmission of the first information during the first time period based upon the current time.

20. The device of claim 19, wherein the timing information received over a second wireless channel is satellite transmitted.

21. The device of claim 17, wherein the first information includes a Geocast destination.

22. The device of claim 17, wherein the first information includes a unicast destination.

23. The device of claim 17, wherein the unicast destination is based upon a transmission path of a received geocast transmission.

24. A method comprising:
setting the receive sensitivity of a device to a first sensitivity during a first time period, wherein during the first time period reception of signals transmitted in a first channel is permitted by the device using the first sensitivity level; and
setting the receive sensitivity of the device to a second sensitivity during a second time period, wherein during the second time period reception of signals transmitted in the first channel is permitted by the device using the second sensitivity level.

25. The method of claim 24 further comprising:
determining a current time based upon timing information received over a second wireless channel;
adjusting a time maintained by a first device based upon the current time; and wherein
determining the first time period and the second time period based the time maintained by the first device after adjusting.

26. The method of claim 25, wherein the timing information received over a second wireless channel is satellite transmitted.

* * * * *